United States Patent [19]
Rohloff

[11] Patent Number: 6,048,287
[45] Date of Patent: Apr. 11, 2000

[54] MULTISPEED BICYCLE GEAR SYSTEM

[76] Inventor: Bernhard Rohloff, Moenchebergstrasse 30, D-34125 Kassel, Germany

[21] Appl. No.: 09/214,970

[22] PCT Filed: May 15, 1998

[86] PCT No.: PCT/DE98/01366

§ 371 Date: Apr. 30, 1999

§ 102(e) Date: Apr. 30, 1999

[87] PCT Pub. No.: WO98/52817

PCT Pub. Date: Nov. 26, 1998

[30] Foreign Application Priority Data

May 16, 1997 [DE] Germany ............................ 197 20 796

[51] Int. Cl.[7] .............................. B62M 11/18; F16H 3/44
[52] U.S. Cl. .......................... 475/297; 475/289; 475/312; 475/340
[58] Field of Search .................................. 475/297, 289, 475/312, 340, 296, 288, 311, 339

[56] References Cited

U.S. PATENT DOCUMENTS

| | | | |
|---|---|---|---|
| 5,078,664 | 1/1992 | Nagano | 475/296 X |
| 5,855,530 | 1/1999 | Huang et al. | 475/288 X |
| 5,961,416 | 10/1999 | Shoge | 475/297 |

FOREIGN PATENT DOCUMENTS

| | | |
|---|---|---|
| 383 350 B1 | 6/1995 | European Pat. Off. . |
| 41 42 867 A1 | 7/1992 | Germany . |
| 42 03 509 A1 | 8/1993 | Germany . |
| 43 42 347 C1 | 2/1995 | Germany . |

*Primary Examiner*—Charles A Marmor
*Assistant Examiner*—Ankur Parekh
*Attorney, Agent, or Firm*—Michael J. Striker

[57] ABSTRACT

Figure 2:
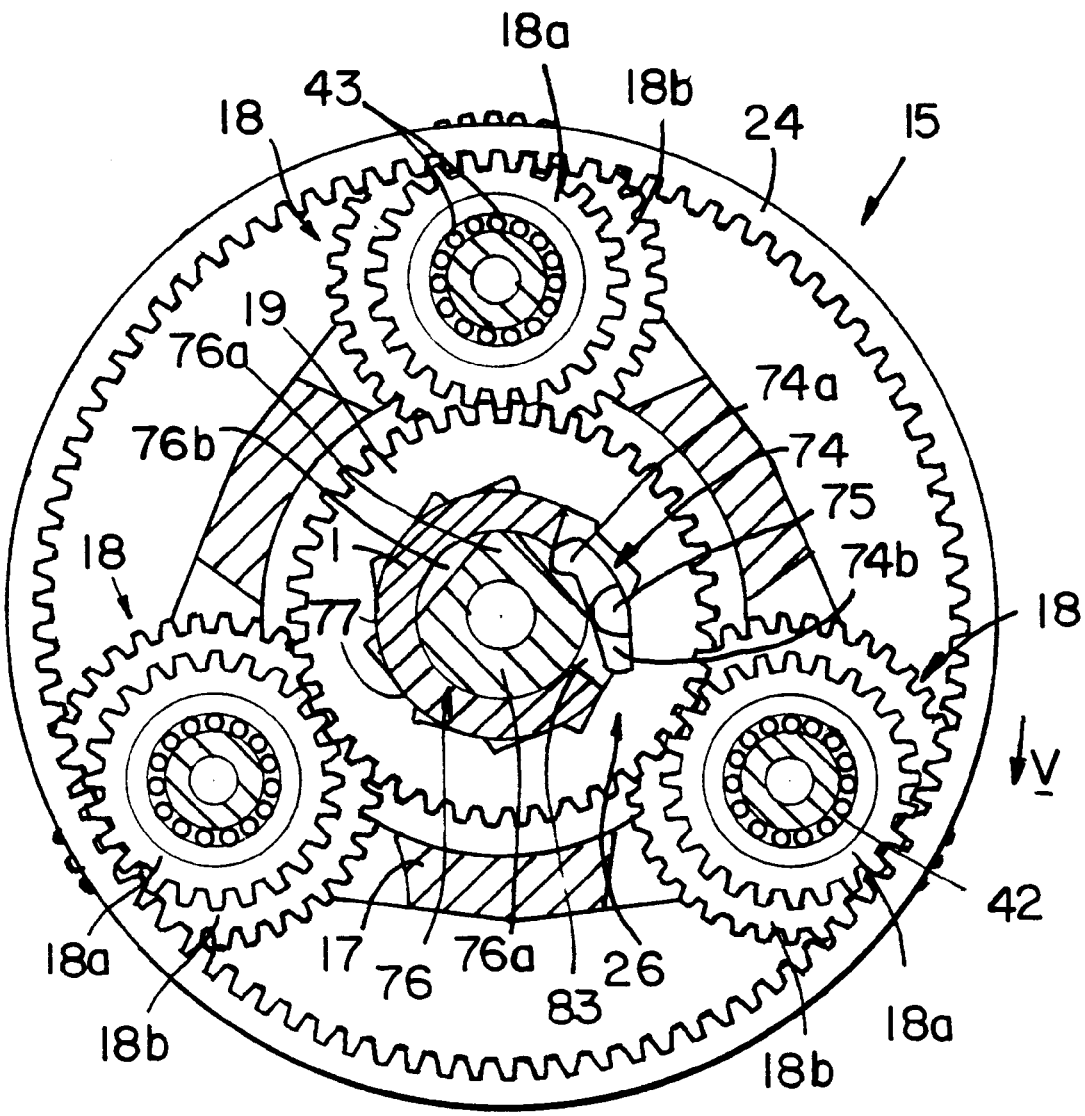

The invention relates to a multispeed gearshift mechanism for bicycles. The gearshift mechanism contains a shaft (1), which can be mounted, fixed against relative rotation, on a bicycle frame, an actuator (7), rotatably seated on the shaft (1), a shell (12), rotatably seated on the shaft (1), and a planet wheel gearshift mechanism (15) arranged in the shell (12) and connecting the actuator (7) and the shell (12) with at least one sun wheel (19) rotatably seated on the shaft (1), a ring gear (24), a planet carrier (17) and a planet wheel (18) rotatably seated on the latter, and a clutch device (26) for providing at least two gear ratios between the actuator (7) and the shell (12), wherein the clutch device (26) has a tooth arrangement (77), a selector ratchet (74) and a rotatably seated actuating member (76) intended for controlling the latter, which can be operated from the outside, in such a way that for selecting the gear ratios the selector ratchet (74) can be selectively put into engagement with the tooth arrangement (77) or disengaged therefrom. In accordance with the invention, the tooth arrangement (77) is provided on the sun wheel (19), the shaft (1) has a section, which is designed as a hollow body and receives the actuating member (76), and the selector ratchet (74) is seated in an opening (83) of an outer wall, delimiting the hollow body, of this section (FIG. 2).

19 Claims, 10 Drawing Sheets

FIG. 6
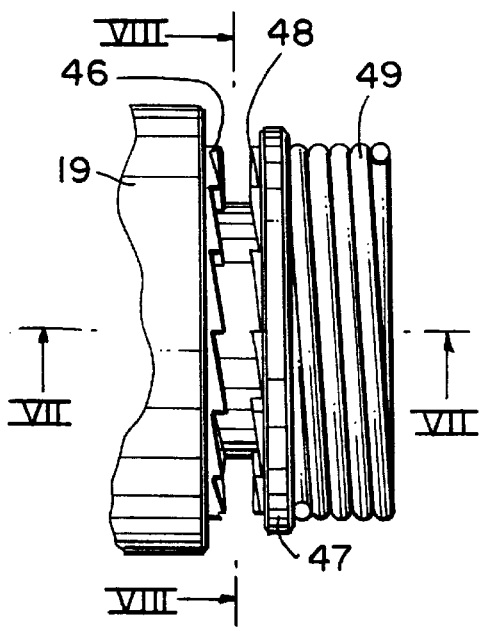
FIG. 7
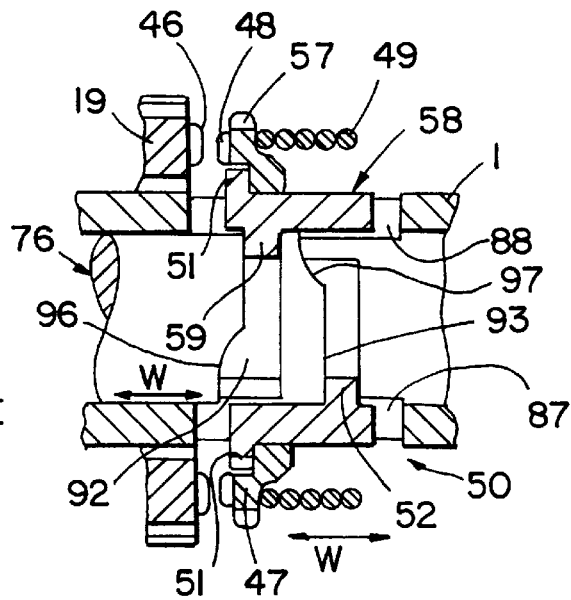
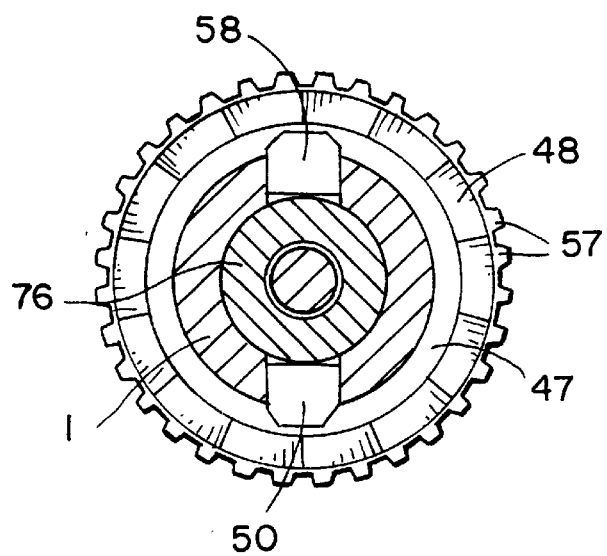
FIG. 8

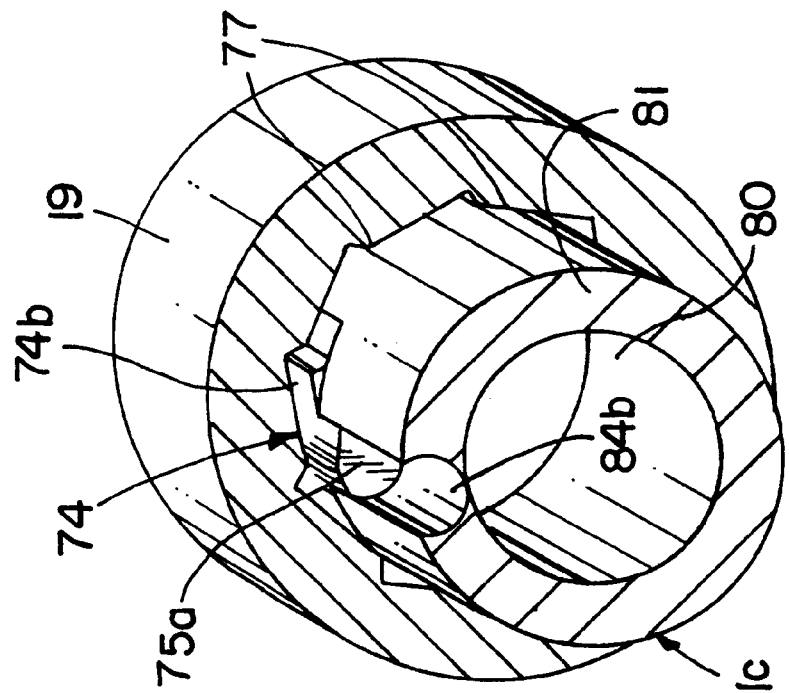
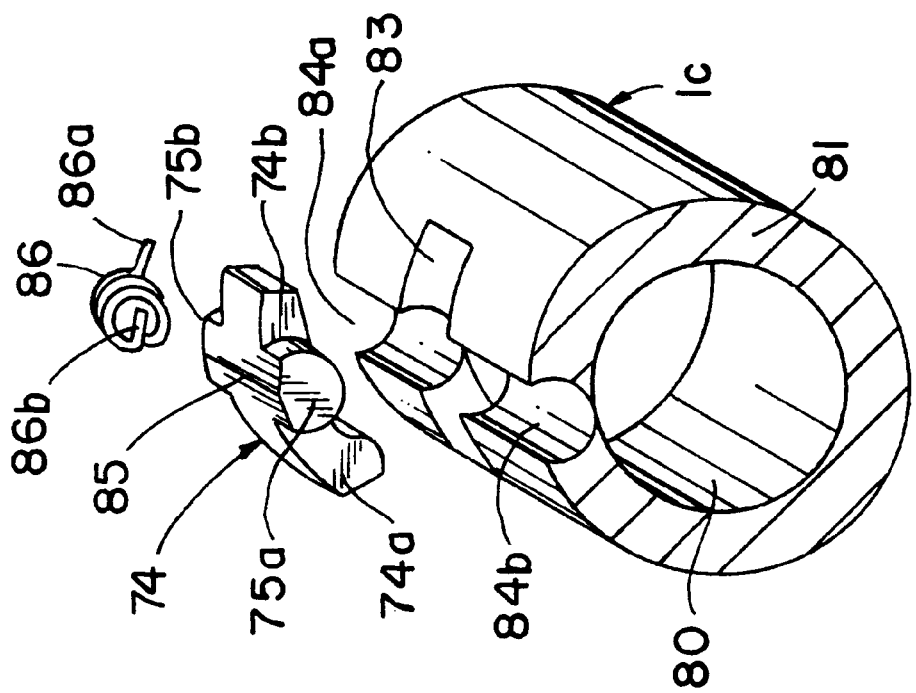
FIG.10
FIG.9

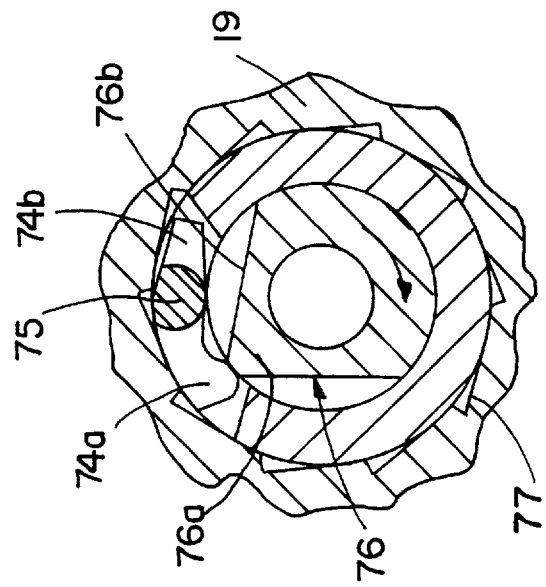
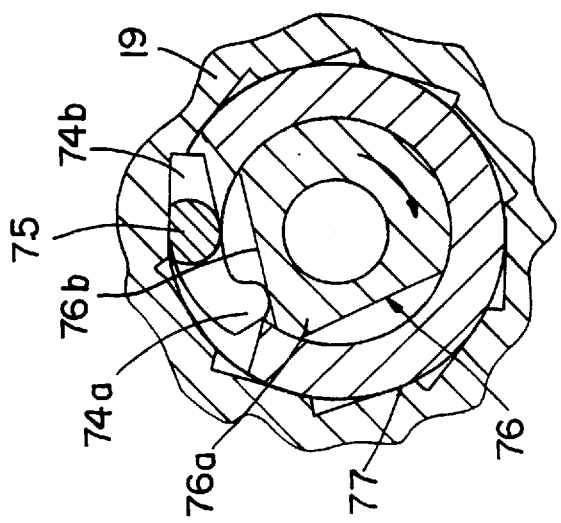
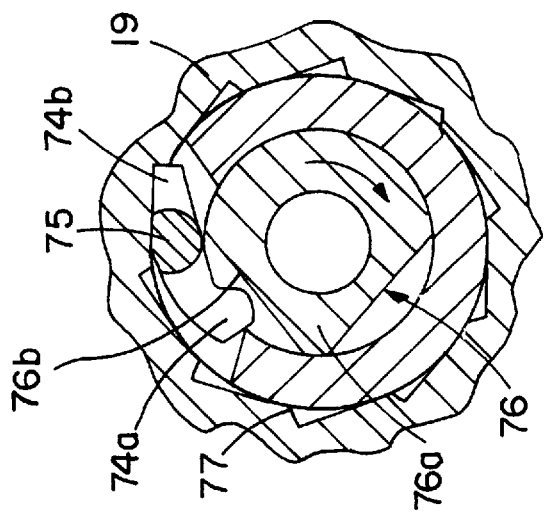

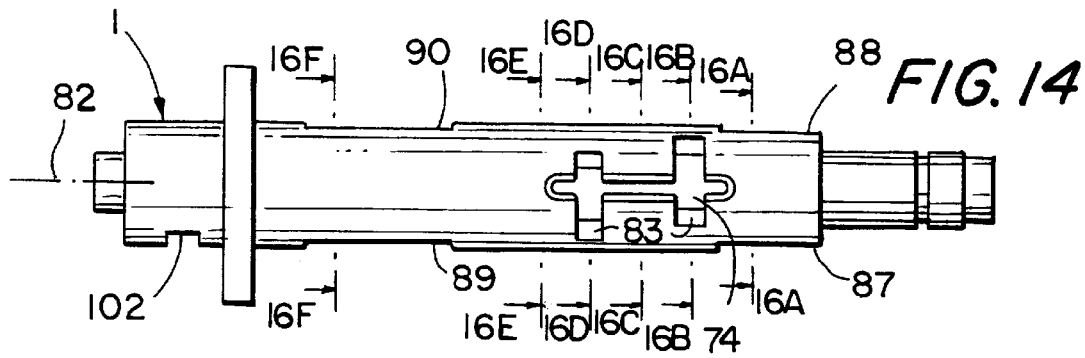
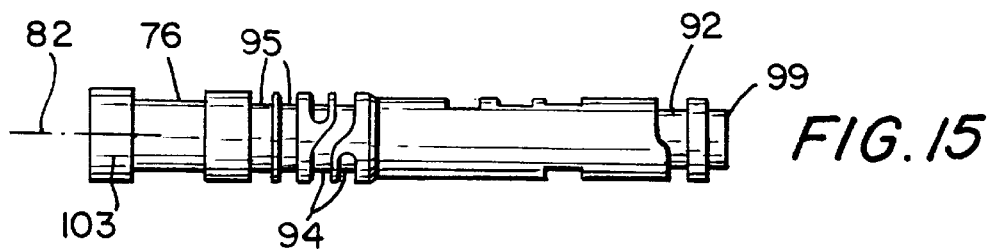
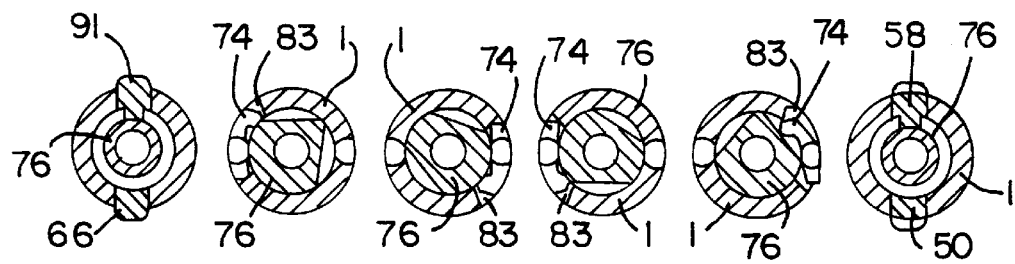

MULTISPEED BICYCLE GEAR SYSTEM

The invention relates to a multispeed gearshift mechanism of the species recited in the preamble of claim 1.

Multispeed gearshift mechanisms for bicycles, in particular in the form of multispeed gearshift mechanism hubs, are known in many embodiments. Like derailleurs, they are used to provide several selectable gear steps, or respectively gear ratios. Up to now it has been possible to realize up to twelve gear steps with such gears which, as a rule, was accomplished by placing at least two planetary wheel gears, which hereinafter will be called planet gears for short, in series (DE 42 03 509 A1, DE 43 42 347 C1).

To engage the various gears steps, it is customary in connection with such gears to connect at least one sun wheel in a manner fixed against relative rotation selectively with the hub shaft, wherein a connection "fixed against relative rotation" is understood to be such, that the sun wheel is fixedly connected with the hub shaft only in one selected direction of rotation, while in the opposite direction of rotation it can turn on the hub shaft in the manner of a free-wheeling device. Selector ratchets, which engage teeth and can be selectively disengaged from them, are used for creating this state.

In known multispeed gears of the species identified at the outset (EP 0 383 350 B1, DE 41 42 867 A1), the tooth arrangement consists of radially projecting teeth applied to the outer jacket of a hub shaft, while the selector ratchets are pivot levers, which have been resiliently prestressed and are pivotably seated on the sun wheels. To prevent the engagement of the selector ratchets with the tooth arrangement, or to release selector ratchets which are already engaged from this engagement, a selector sleeve, rotatably seated on the hub shaft and provided with locking tongues, is additionally provided. It can be rotated on the hub shaft in such a way that either the dropping of the ratchets into the gaps between the teeth is prevented, or that already dropped selector sleeves are released from engagement by running up on an appropriate inclined surface.

A problem of such shifting devices consists in that they lead to a not inconsiderable increase in diameter and therefore also to an increase in the weight of the gear hub, since all shiftable elements must be arranged within the effective range of the selector sleeve surrounding the hub shaft. Furthermore, the selector sleeve prevents the application of further selector devices, in particular those operating by means of axially displaceable selector slides (DE 42 03 509 A1), so that either the multispeed hub is designed to be large and therefore also heavy, or the entire switch mechanism must be put together from components which are of such small and weak dimensions, that a great susceptibility to failure results.

In contrast to this, it is the object of the invention to design the multispeed gear of the species identified at the outset in such a way that the selector devices do not result in considerable enlargements of the diameter of the gear, but that a large operational dependability is still assured.

The characterizing features of claim 1 are employed to attain this object.

Further advantageous characteristics of the invention ensue from the dependent claims.

Figure 1:
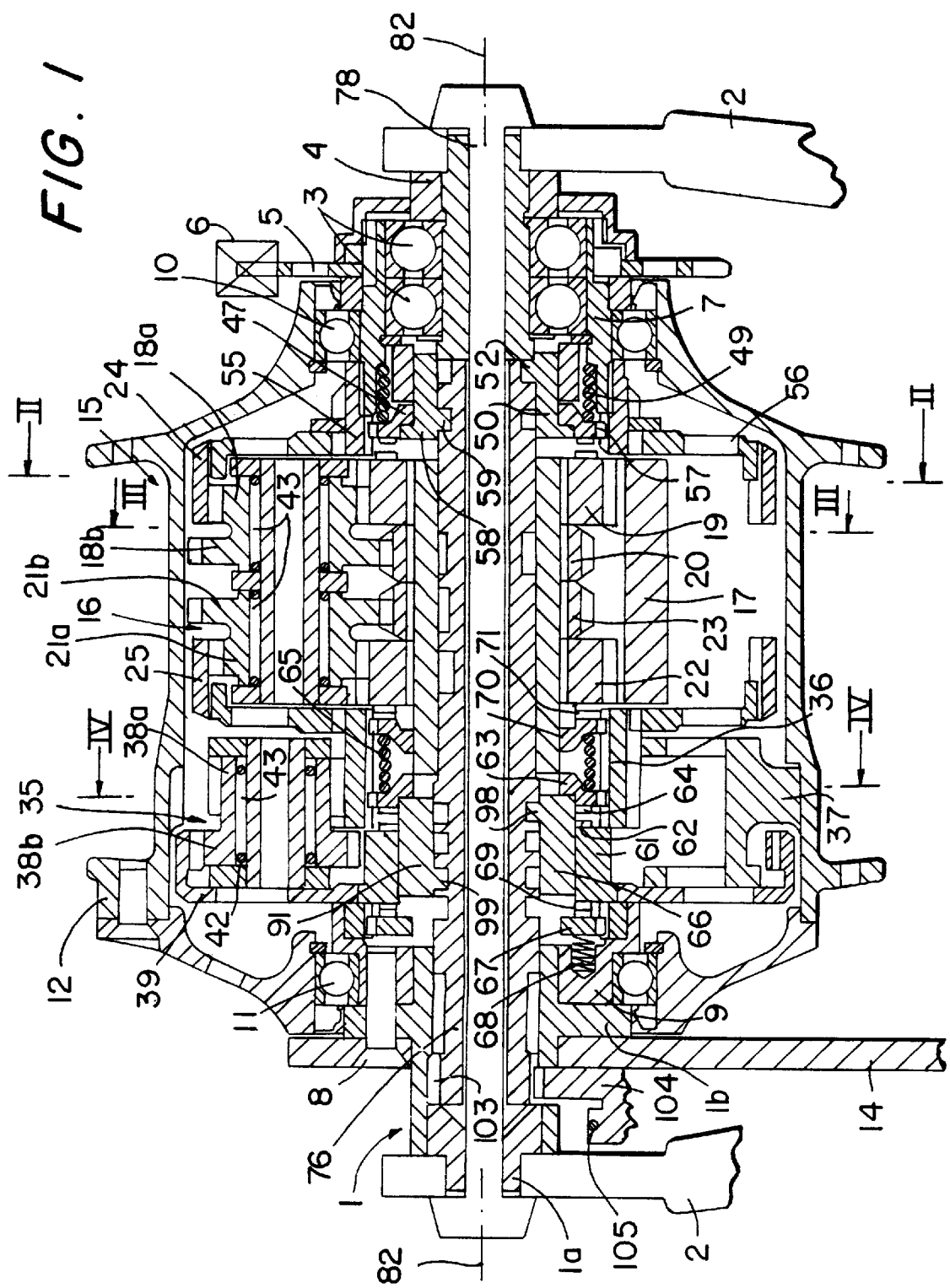
Figure 3:
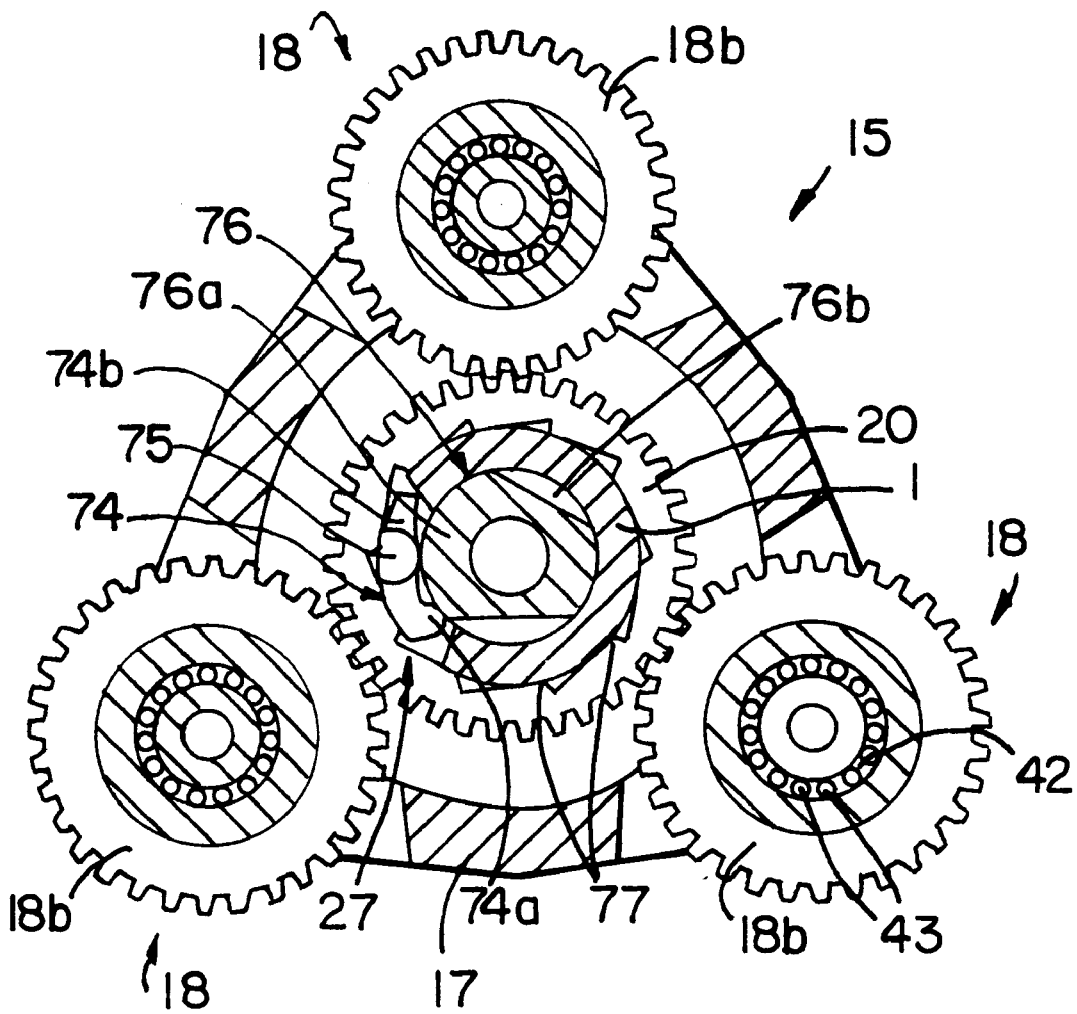
Figure 4:
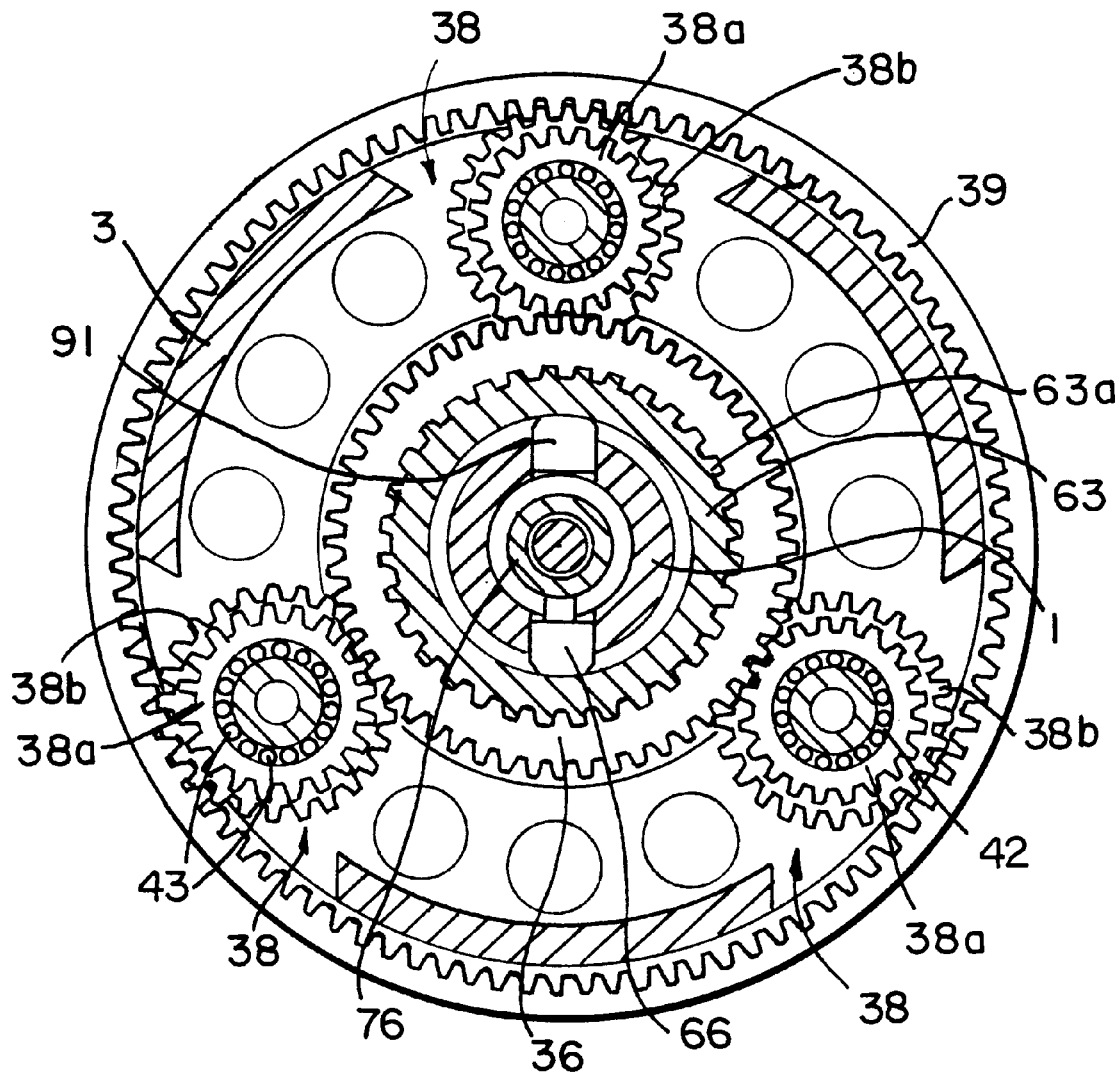
Figure 5:
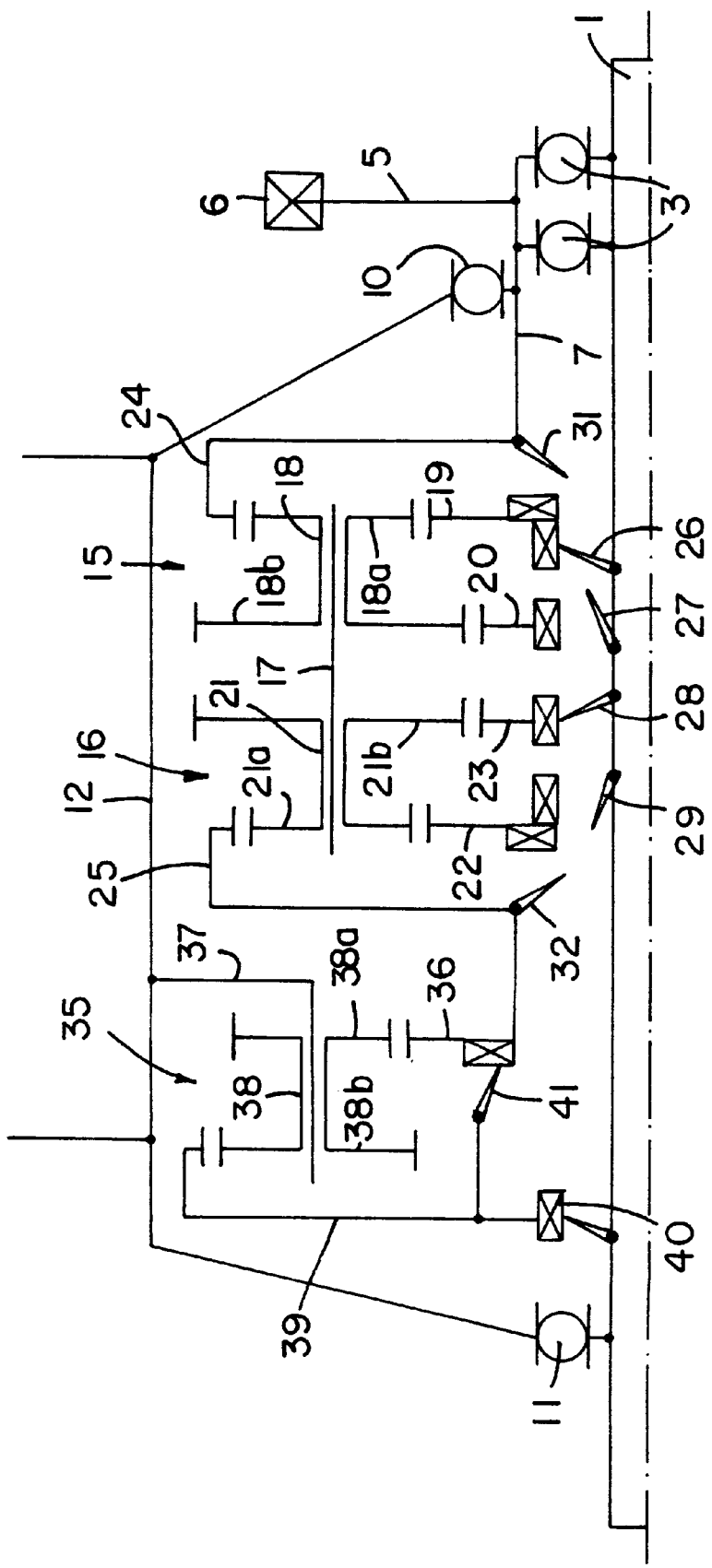
Figure 17:
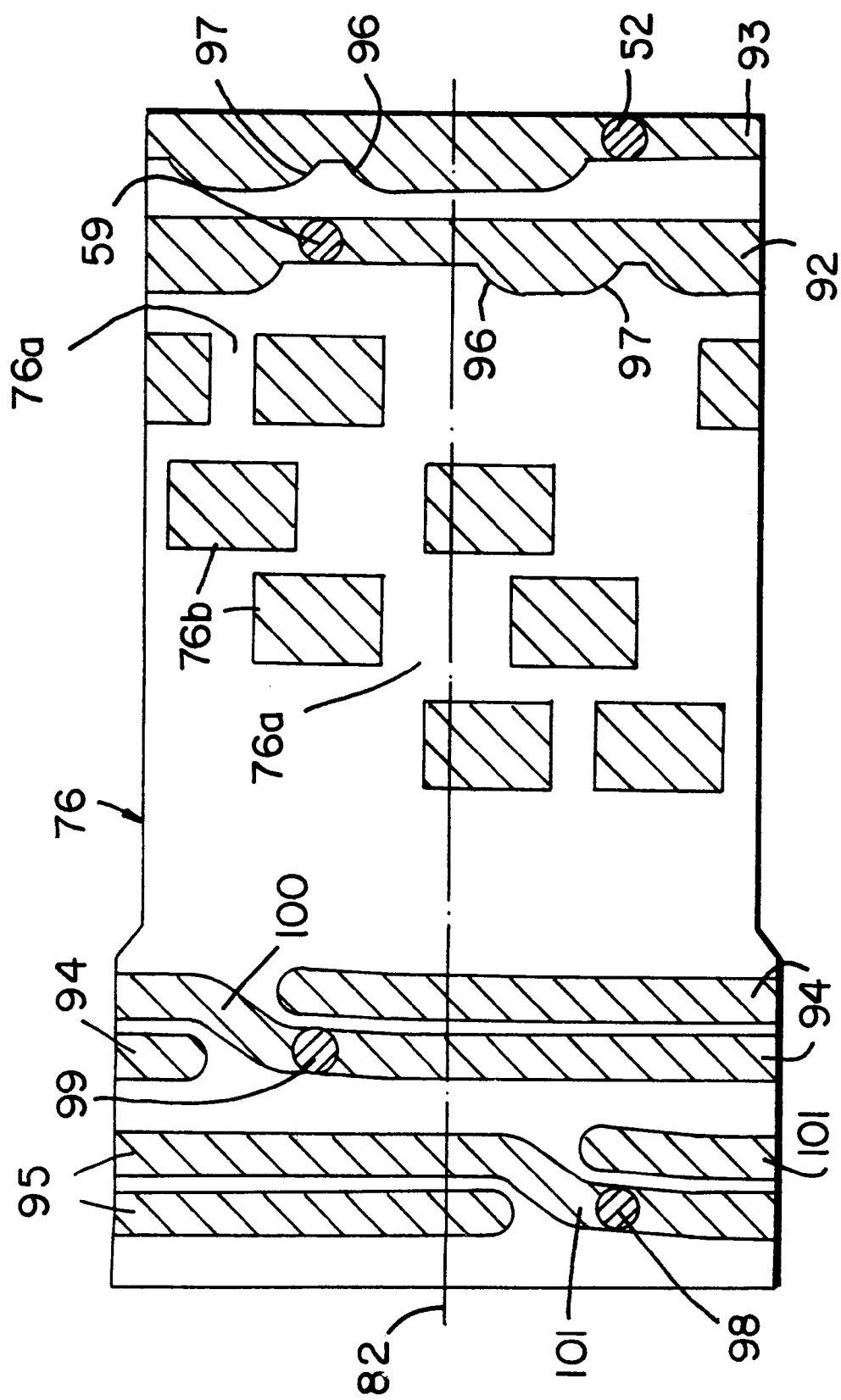

The invention will be explained in more detail in what follows by means of an exemplary embodiment in connection with the attached drawings. Shown are in:

FIG. 1, a longitudinal sectional view of a multispeed gear in accordance with the invention, FIGS. 2 to 4, cross-sectional views of the planetary gears of the gear hub approximately along the lines II—II to IV—IV in FIG. 1 on a slightly enlarged scale, FIG. 5, a basic sketch of the gear in accordance with FIG. 1, FIG. 6, a lateral view of a clutch of the multispeed gear in accordance with FIG. 1 on an enlarged scale, FIGS. 7 and 8, sectional views along the lines VII—VII and VIII—VIII in FIG. 6, FIG. 9, a section of a hub shaft in accordance with the invention provided with a selector ratchet in an enlarged and drawn apart representation, FIG. 10, a representation corresponding to FIG. 9, but in connection with a sun wheel mounted on the hub shaft, FIGS. 11 to 13, respectively one cross section through the arrangement in accordance with FIG. 10 in three different positions of a selector ratchet, FIG. 14, a view from above on the shaft of the gear in accordance with the invention in FIG. 1 in a slightly reduced scale, FIG. 15, a view from above on a selector and cam shaft of the gear in accordance with FIG. 1, FIG. 16, sections along the section lines A—A to F—F of FIGS. 14 and 15 through the hub shaft in accordance with FIG. 14 with a selector and cam shaft in accordance with FIG. 15 inserted, and FIG. 17, a schematic representation of the relative position of the cams and guide slots of the selector and cam shaft in accordance with FIG. 7 in a developed view.

In accordance with FIG. 1, a multispeed gear specially designed as a multispeed gear hub contains a hollowly embodied hub shaft 1, whose ends 1a embodied in the manner of a trunnion are seated in correspondingly designed outlet ends of frame elements 2, which are only schematically represented, and which are mounted in these, fixed against relative rotation, for example by means of a conventional quick-action tightener, nuts or in any other way. On the drive side the hub shaft 1 is provided with roller bearings 3, which are axially fixed on it by means of a clamping ring 4. An actuator 7, which is fixedly connected with a drive pinion 5 of a chain 6 or the like, is rotatably seated on the hub shaft 1 by means of the ball bearings 3. The hub shaft 1 has a radial flange 1b on the power take-off side and at a preselected distance from the clamping ring 4, on which a seating ring 9, which has been axially drawn on the shaft hub 1, is fastened by means of screws 8 in an axially non-displaceable manner and fixed against relative rotation. A hub shell 12 is rotatably seated on the actuator 7 and the seating ring 9 by means of bearings 10 and 11. In this case the drive pinion 5, the actuator 7 and the hub shell 12 are located coaxially in relation to the hub shaft 1. In addition a support 14 connected, fixed against relative rotation, with the seating ring 9 and the flange 1b and which is to be connected with one of the frame elements 2, can be provided, which is used for supporting the difference between the torque introduced by the actuator 7 into the gear hub and the torque passed on via the gear hub 12 to a rear wheel of the bicycle, wherein the rear wheel, not represented, is connected in the conventional manner by means of spokes or the like with the hub shell 12. If the gear hub is provided with a brake, not represented, the support 14 also takes on the support of the braking moment.

A gearshift mechanism is seated in the hub shaft 12 and contains two planetary gears 15 and 16, which are arranged one behind the other on the hub shaft 1 and are provided with a common planet carrier 17, preferably made of one piece. The first planetary gear 15, situated on the drive side and in the vicinity of the actuator 7, contains, as can be seen in particular from FIGS. 2, 3, 5 and 6, a planet carrier section with at least one first planet wheel 18, having at least two stages 18a, 18b of different diameters, wherein the stage 18a has a smaller diameter and meshes with a first sun wheel 19 of a comparatively large diameter, while the stage 18b, which has a larger diameter, is in engagement with a second sun wheel 20, which has a correspondingly smaller diameter. The second planetary gear 16, which is axially farther distant from the actuator 7, contains a planet carrier section with at least one second planet wheel 21, which also has at least two stages 21a, 21b of different diameters, wherein the stage 21a with the smaller diameter is in engagement with a third sun wheel 22 of comparatively large diameter, and the stage 21b having the larger diameter is in contact with a fourth sun wheel 23, which has a correspondingly smaller diameter. In this case it is understood that the described planet and sun wheels, as well as the planet carriers can rotate around the hub shaft 1 in the usual way.

Finally, the planetary gears 15, 16 each have a first, or respectively second ring gear 24, or respectively 25, which are coaxial in respect to the hub shaft 1, wherein the ring gear 24 is in engagement with the stage 18a and the ring gear 25 with the stage 21a of the first, or respectively second planet wheel 18, or respectively 21.

A gearshift mechanism is additionally intended for the provision and selection of several gear ratios between the actuator 7 and the hub shell 12, which has means 26, 27, 28 and 29, schematically indicated in FIGS. 2 to 6, preferably in the form of clutches, by means of which the sun wheels 19, 20, 22 and 23 can be selectively connected with the hub shaft 1. The clutches 26 to 29 are, for example, embodied as free-wheeling ratchet devices, which can be controlled from outside of the gear hub by means of customary selector levers or the like.

Multispeed gear hubs of this type intended for bicycles are generally known to one skilled in the art and therefore need not be explained in greater detail. To prevent repetitions, reference is made here, for example, to the printed publications DE 41 42 687 A1 and DE 43 42 347 C1, which here are made the subject of the present disclosure in order to prevent repetitions.

In accordance with a particular characteristic of the invention, the planetary gear 15 is driven at its ring gear 24, which to this end is connected, fixed against relative rotation and axially non-displaceable, with the actuator 7. In addition, in connection with a preferred embodiment of the invention, both planetary gears 15, 16 are constructed and arranged laterally reversed in relation to an imaginary plane of symmetry extending between them, and vertically in relation to the hub shaft 1 wherein, for example, the two planet wheel stages 18b, 21b with the larger diameter are immediately facing each other (FIGS. 1 and 5), while the two planet stages 18a, 21a having the smaller diameter are at greater distances from the imagined plane of symmetry. In this case the stages 18a, 21a preferably have identical diameters and number of teeth, and the same applies to the diameters and number of teeth of the stages 18a, 21a. It is possible to greatly reduce the costs of production and storage by means of this laterally reversed design. It is correspondingly possible to embody the sun wheels 20, 23, or respectively 19, 22, and the ring gears 24, 25 in identical pairs. Therefore only five numbers of teeth must be fixed on four different components 18, 19, 20 and 24, since the components 21, 22, 23 and 24 correspond identically to the components 18, 19, 20 and 24.

If the described gearshift mechanism is only used as a seven speed gear, the second ring gear 25 of the planetary gear 16 is used for power take-off, which in this case and differently from FIGS. 1 and 5, 6, could be directly and rigidly connected with the hub shell 12. If in this case a free-wheeling device is desired for the hub shell 12, the ring gear 25 could be connected, for example, with a ratchet wheel carrier having free-wheeling ratchets which work together with appropriate teeth in the hub shell 12 in such a way that a transfer of torque can take place only in one direction.

With such a variant, the four clutches 26 to 29 are initially used for providing different gears. Since here the actuator 7 is fixedly connected with the first ring gear 24, and the second ring gear 25 is fixedly connected with the hub shell 12, the first and the third sun wheels 19, 23, for example, are connected by means of the clutches 26 and 28 with the hub shaft 1 (FIG. 5), while the sun wheels 20, 22 can freely rotate. Because of this the first planetary gear 15 determines the rpm for the planet carrier 17 which, in turn, drives the planet wheel 21. The latter rolls off on the fixed third sun wheel 23, which by means of this determines the rpm of the second ring gear 25 and therefore of the hub shell 12. A further total gear ratio can be provided in that the clutches 27, 29 are engaged and the clutches 26, 28 disengaged, so that now the sun wheels 20, 22, which are connected with the hub shaft 1, determine the total gear ratio. Further gear ratios can be provided in that the sun wheels 19, 22, or respectively 20, 23 are connected with the hub shaft 1. However, with a laterally reversed design of the two planetary gears 15, 16, this respectively results in a total gear ratio of 1:1, i.e. in a direct gear step.

In accordance with a further, particularly essential characteristic of the invention, the selector device has two further clutches 31 and 32 (FIG. 5) for increasing the number of gear steps in spite of the use of the common planet carrier 17, of which the clutch 31 is used for the selective connection of the first ring gear 24 with the first sun wheel 19, while the second ring gear 25 can be selectively coupled with the fourth sun wheel 22 by means of the second clutch 32. By means of this, when the first clutch 31 is connected, the first planetary gear 15 is blocked and, when the second clutch 32 is connected, the second planetary gear 16 is blocked, i.e. the planet carrier 17 always turns at the rpm of the actuator 7 when the clutch 31 is connected while, with the clutch 32 connected, the second ring gear 25 always rotates at the rpm of the common planet carrier 17. Preferably the two clutches 31, 32 are designed the same as the above mentioned clutches 26 to 29. An alternative embodiment will be explained further down below.

With the laterally reversed construction of the planetary gears 15, 16, it is possible by means of the clutches 31, 32 to set further gear steps in addition to the two gear steps described above, as follows: if the clutch 31 is engaged and the clutch 32 is disengaged, it is possible by means of the clutches 28, 29 to selectively connect the sun wheel 23 or the sun wheel 22 with the hub shaft 1 and to release the respectively other sun wheel, which results in two gear ratios, determined by the second planetary gear 16, between the planet carrier 17 and the hub shell 12, because the gear ratio of the first planetary gear is 1:1. But if the clutch 32 is engaged and the clutch 31 disengaged (FIG. 6), the gear ratio of the second planetary gear 16 is fixed at 1:1, while two gear ratios, determined by the first planetary gear 15, between the actuator 7 and the planet carrier 17 can be adjusted, in that one of the sun wheels 19, 20 is selectively connected with the hub shaft 1 by means of the clutches 26, 27. Finally, by engaging both clutches 31, 32 it is also possible in this way to provide a gear ratio 1:1 between the actuator 7 and the hub shell 12. Altogether, the described multispeed hub therefore is a seven speed gear hub.

A particular characteristic of the two clutches 31, 32 lies in that by means of them the sun wheels 19, 22 are connected with the actuator 7, or respectively the hub shell 12, in addition to the associated ring gear 24, or respectively 25, and not instead of these. Therefore, when actuating the clutches 31, 32, always only a portion of the drive or power take-off force coming from the actuator 7, or respectively exerted on the hub shell 12, is shifted, and the shifting has the only purpose of blocking the respective planetary gear or to cancel the blockage. Because of the special configuration of the described gearshift mechanism, it is possible to achieve that, for example, only approximately 50% of the total force must be shifted. In contrast to this, with the prior art as a rule 100% of the drive and power take-off force are shifted between a ring gear and an associated planet carrier or vice versa in order to create a second force transmission path in this way. Therefore the gearshift mechanism in accordance with the invention provides the advantages that it is only necessary to exert considerably reduced forces on the clutches, and the selector elements can therefore be laid out smaller and lighter, or respectively, that considerably greater drive, or respectively power take-off forces can altogether be transmitted with the same clutch forces. This also has a positive effect on the forces which must be exerted for operating the clutches 31, 32 when shifting under a load.

The described seven speed gearshift mechanism can be converted into a fourteen speed gearshift mechanism by a simple add-on set. In accordance with FIGS. 1 and 5, a third planetary gear 35 with a fifth sun wheel 36, a second planet carrier 37 with at least a third planet wheel 38 and a second ring gear 39 are provided for this. The planet wheel 38 has two stages 38a, 38b (FIGS. 4 and 5) of different diameters. The stage 38a with the smaller diameter is in engagement with the fifth sun wheel 36, but the stage 38b with the larger diameter is in engagement with the second ring gear 39, which is furthermore secured against reverse rotation by a free-wheeling device 40 (FIG. 5) supported on the hub shaft 1. In addition, the fifth sun wheel 36 is fixedly connected with the second ring gear 25 and is for example made of one piece with it (FIG. 1). Finally, in this case the third planet carrier 37 is fixedly connected with the hub shell 12, while the second ring gear 25 with the fifth sun wheel 36 can be jointly selectively connected with the third ring gear 39 or disengaged from it by means of a further clutch 41, preferably having a free-wheeling device. If the clutch 41 in accordance with FIG. 5 is engaged, the third planet carrier 37 turns at the rpm of the second ring gear 25, i.e. the third planetary gear 35 is blocked at a gear ratio of 1:1, so that it is out of action and the above explained gear steps can be realized. However, if the clutch 41 is disengaged, the power take-off rpm of the second ring gear 25 are transmitted via the fifth sun wheel 36 on the third planet carrier 37, since the ring gear 39 is supported, fixed against relative rotation, on the hub shaft 1 via the free-wheeling device 40 and therefore the planet wheels 38 driven by the sun wheel 36 take the planet carrier 37 along. In this case the third planetary gear 35 acts, for example, as a reduction gear with a gear ratio of less than 2:1, so that the seven gear steps described above can be made selectively effective at a direct gear ratio of 1:1 or with a downstream connected reduction gear. Furthermore, in regard to the clutch 41, the advantage described above in connection with the clutches 31, 32 has the result, that by means of it is always only necessary to shift a portion of the driving force delivered by the second ring gear 25.

The gearshift mechanism described is operated, for example, with the number of teeth found in Table 1.

TABLE 1

| WHEEL | Number of Teeth |
|---|---|
| Sun 19 | 42 |
| Sun 20 | 35 |
| Sun 22 | 42 |
| Sun 23 | 35 |
| Sun 36 | 51 |
| Planet 18 | |
| Stage 18a | 24 |
| Stage 18b | 32 |
| Planet 21 | |
| Stage 21a | 24 |
| Stage 21b | 32 |
| Planet 38 | |
| Stage 38a | 20 |
| Stage 38b | 26 |
| Ring gear 24 | −90 |
| Ring gear 25 | −90 |
| Ring gear 39 | −96 |

The described number of teeth has the result that the first planetary gear 15 operates at a gear ratio between the actuator 7 and the planet carrier 17 of approximately 1.467:1, when the clutch 26 is engaged, and of approximately 1.292:1, when the clutch 27 is engaged. However, the gear ratio between the planet carrier 17 and the second ring gear 25 is reversed to approximately 1:1.292, when the clutch 28 is engaged, or respectively 1:1.467, when the clutch 29 is engaged. Because of this, the planetary gear 15 always operates as a reduction gear, but the planetary gear 16 always as a step-up gear. Finally, the gear ratio of the add-on set in the exemplary embodiment is approximately 2.448:1, so that a reduction results on the whole when the clutch 41 is disengaged, and 1:1, when the clutch 41 is engaged.

In connection with the described arrangement it is possible by means of the number of teeth recited in Table 1 to realize the gear steps recited in Table 2. In this case, the letter "x" underneath the various clutches indicates, which clutch is in the engaged state at the respective gear step, wherein a lack of the letter "x" indicates that the respective clutch is disengaged. As in the above description, "gear ratio" is defined as the ratio of the drive rpm to the power take-off rpm.

TABLE 2

| Gear Step | Clutch | | | | | | | Gear Ratio | Step Jump |
| | 26 | 27 | 28 | 29 | 31 | 32 | 41 | | |
|---|---|---|---|---|---|---|---|---|---|
| 1st Gear | x | | | | | x | | 3.591 | 13.5% |
| 2nd Gear | | x | | | | x | | 3.163 | 13.8% |
| 3rd Gear | x | | x | | | | | 2.779 | 13.5% |
| 4th Gear | | | | x | x | | | 2.448 | 13.5% |
| 5th Gear | | x | | x | | | | 2.157 | 13.8% |
| 6th Gear | | | x | | x | | | 1.895 | 13.5% |
| 7th Gear | | | | x | x | | | 1.670 | 13.8% |
| 8th Gear | x | | | | | x | x | 1.467 | 13.5% |
| 9th Gear | | x | | | | x | x | 1.292 | 13.8% |
| 10th Gear | x | | x | | | | x | 1.135 | 13.5% |
| 11th Gear | | | | | x | x | x | 1.000 | 13.5% |
| 12th Gear | | x | | x | | | x | 0.881 | 13.8% |
| 13th Gear | | | x | | x | | x | 0.774 | 13.5% |
| 14th Gear | | | | x | x | | x | 0.682 | — |

It follows from this that comparatively constant step jumps between approximately 13.5% and 13.8% are obtained, if the relation of the ratio of one gear step to the ratio of the respectively faster gear step is called a gear jump, and the gear jump indicated for any arbitrary gear in the table indicates the transition from this gear to the respectively next gear.

It is furthermore possible by means of the described gearshift mechanism to vary the total gear ratio, i.e. the relationship between the largest gear ratio and the smallest gear ratio. In the exemplary embodiment, the total gear ratio is approximately 526%, so that a very broad range of ratio relationships is covered.

A further essential advantage of the described embodiment, considered to be the best at this time, of the gear mechanism lies in that the number of teeth of the different stages of the planet wheels can be made comparatively large at 20, 24, 26 and 32. By means of this it is possible to seat the planet wheels 18, 21 and 38 rotatably in the planet carriers 17 and 37 by means of rolling bearings, in particular needle roller bearings, indicated in FIGS. 1 to 4, wherein each rolling bearing consists of a bearing cage 42, guided between two disk-shaped planet carrier elements, and a plurality of bearing needles 43 arranged in the cage, whose axes are arranged parallel in relation to the axes of rotation of the planet wheels 18, 21 and 38. It is possible by means of this to keep frictional losses small, which is advantageous for the total efficiency. Finally, the comparatively small difference between the number of teeth of the respectively meshing sun and planet wheels is also advantageous for efficiency.

A preferred exemplary embodiment of the clutch 31, considered to be the best at this time, is represented in FIGS. 1 and 6 to 8. In accordance with this, the sun wheel 19 is provided on its side facing the actuator 7 with saw-toothed arrangement 46, situated opposite a coupling ring 47, which is arranged coaxially in relation to the hub shaft 1 and has on its side facing the sun wheel 19 a corresponding saw-toothed arrangement 48, which fits into the tooth arrangement 46. The coupling ring 47 is prestressed by a compression spring 49, which is coaxial in relation to the hub shaft 1 and is embodied as a helical spring, whose one end is supported on the actuator (FIG. 1) and whose other end on the coupling ring 47 and tries to push the latter in the direction toward the sun wheel 19. At least one selector slide 50, for example, is provided for controlling the coupling process, which is seated, displaceable in the direction of an arrow w, in an axis-parallel guide slit of the hub shaft 1 and is provided with a detent tooth 51, with which it rests, for example, against the front of the coupling ring 47 having the tooth arrangement 48. In addition, the selector slide 50 has a radially inward projecting selector element, for example in the form of a selector pin 52, which is used for actuating the selector slide 50 in a manner to be explained further down below. Here the arrangement is such that, in the position of the selector slide 50 shown in FIG. 1, the coupling ring 47 is maintained against the pressure of the compression spring 49 at such an axial distance from the sun wheel 19 that the two tooth arrangements 46, 48 are not in engagement. However, if the selector slide 50 is axially pushed further forward in the hub shaft 1, i.e. moved to the left in FIGS. 1 and 7, the compression spring 49 pushes the coupling ring 47 slowly forward in the direction toward the sun wheel 19 until the two tooth arrangements 46, 48 come into engagement. Here, the inclined edges of the saw-toothed arrangements 46, 48 are aligned in the direction of rotation in such a way that, when the teeth are in engagement, the sun wheel 19 can be rotated along in the drive direction by the actuator 7 via the coupling ring 47. However, if the actuator 7 is turned in the opposite direction, the tooth arrangements 46, 48 can slide along each other in the manner of a free-wheeling device, since the coupling ring 47 is seated in an axially yielding manner because of the compression spring 49. The same free-wheeling effect occurs if the sun wheel 19 turns faster than the actuator 7 and in the process passes it. For uncoupling it is merely necessary to pull the selector slide 50 back again until it again takes up the position in accordance with FIGS. 1 and 6 to 8.

Seating of the coupling ring 47 is usefully provided with the aid of a connecting tube 55 (FIG. 1), which is arranged coaxially with the hub shaft 1, is fixedly connected with the actuator 7 and on which a front face 56 of the first ring gear 24 is also fastened. On its interior surface, the connecting tube 55 has keyways, which extend axially parallel, and interlockingly receive tangs 57 (FIGS. 1, 7, 8), which have been attached to the exterior surface of the coupling ring 47. On the one hand, the coupling ring 47 can be axially displaced in this way in the manner of a dove-tailed connection, but on the other hand it is also seated in the connecting tube 55 in such a way, that it follows, essentially free of play, every rotary movement exerted by the actuator 7 on the connecting tube 55.

To insure that the coupling ring 47 is evenly axially displaced and is not tilted in the process, a second selector slide 58 (FIG. 7), corresponding to the selector slide 50 and controlled in the same way as the latter, is preferably arranged at a location offset by 180° in the circumferential direction of the hub shaft 1, and has a selector element, designed as a selector pin 59, for example.

The clutch 41 (FIGS. 1 and 5) is constructed analogously to the clutch 31 in FIGS. 6 to 8. Here, the ring gear 39 has a hub 61 (FIG. 1) with teeth 62 on the front, which is situated opposite a coupling ring 63 corresponding to the coupling ring 47 in FIGS. 6 to 8 and can be seen in FIG. 4, too, which has been provided with a corresponding saw-toothed arrangement 64 and is acted upon by a compression spring 65. In this case the coupling ring 63 can be axially displaced in the fifth sun wheel 36 with the aid of dove-tailed connectors 63a (FIG. 4), but is seated fixed against relative rotation in respect to the wheel. The compression springs 65 are used for the axial displacement of the coupling ring 63 on the one hand, and on the other hand at least one selector slide 66 corresponding to the selector slides 50, 58 in accordance with FIGS. 6 to 8, and a control rod, not represented, which corresponds to the control rod 54. Thus, in the engaged state, the sun wheel 36 takes the ring gear 39 along in the drive direction, while an oppositely rotating movement of the sun wheel 36 and a passing movement of the ring gear 39 is easily possible, based on the free-wheeling effect described by means of FIGS. 6 to 8. However, if the coupling ring 63 is disengaged from the ring gear 39, the latter drives the planet carrier 37 in the manner described above, wherein the ring gear 39 is supported via the free-wheeling device 40 (FIG. 5) on the hub shaft 1. In this case the free-wheeling device 40 is represented, for example, as a coupling ring 67 which, analogously to FIGS. 6 to 8, is seated in the seating ring 9 axially displaceable, but fixed against relative rotation, and is prestressed in the direction toward the hub 61 by at least one compression spring 68 supported on the ring. The fronts of the hub 61 and the coupling ring 67 facing each other have cooperating saw-toothed arrangements 69 corresponding to FIGS. 6 to 8, wherein the design of the teeth has been selected in such a way that either the described free-wheeling effect results, or a reverse rotation of the ring gear 39 is prevented.

Finally, the clutch 32 (FIG. 5) could also be designed analogously to FIGS. 6 to 8. But it is also alternatively possible to provide a coupling ring 70 in accordance with FIG. 1, whose one front face is supported at the end of the compression spring 65 facing away from the coupling ring 63, but faces the sun wheel 22 with its other front face, and otherwise is seated displaceably, but fixed against relative rotation, in the fifth sun wheel 36, in the same way as the coupling ring 63. The facing front faces of the sun wheel 22 and the coupling ring 70 are provided with saw-toothed arrangements 71 directed in such a way that the sun wheel 22, or respectively the ring gear 25, can take along the coupling ring 70, and therefore also the sun wheel 36 in the drive direction. Since this is always necessary when the sun wheel 22 wants to turn faster than the ring gear 25, or respectively the fifth sun wheel 36, i.e. when none of the two clutches 28, 29 are engaged, it is not necessary to provide a separate selector slide for the coupling ring 70. If the sun wheel 22 tries to turn faster than the sun wheel 36, it automatically takes the latter along because of the action of the compression spring 65 and the coupling ring 70. But if the sun wheel 22 turns slower, or not at all, because it itself or the sun wheel 23 are coupled with the hub shaft 1, the repeatedly explained free-wheeling effect takes place.

An exemplary embodiment of the clutches 26 to 29, considered to be best at this time by Applicant, is schematically represented in FIGS. 2 and 3 by means of the clutches 26 and 27. In accordance with this, the hub shaft 1 is designed as a continuous hollow shaft and a selector ratchet 74 is pivotably seated in the shell of the hollow hub shaft 1 and can be turned around a pivot pin 75 extending parallel with the hub shaft 1. The selector ratchet 74 consists of a two-armed lever, whose lever arm 74a projecting into the hub shaft 1 cooperates with an actuating element, designed here as a selector and cam shaft 76, which is rotatably seated in the hub shaft 1 and which has at least respectively one cam 76a, or respectively a cam depression 76b in the circumferential direction. In addition, the sun wheel 19, or respectively 20, is provided with a tooth arrangement 77 on its interior circumference in such a way, that the lever arm 74b of the selector ratchet 74 can fall into the teeth, as represented in FIG. 2. In this case the arrangement has been made in such a way that, when the lever arm 74a runs up on a cam 76a of the selector and cam shaft 76, the selector ratchet 74 is pivoted in such a way that its lever arm 74b (FIG. 3), which has snapped into the tooth arrangement 77, is pivoted out of the latter and the sun wheel 19, or respectively 20, is released by this whereas, when the lever arm 74a enters into a cam depression 76b (FIG. 2), the lever arm 74b is again brought into engagement with the sun wheel tooth arrangement 77 by a spring, not represented, and therefore the sun wheel 19, or respectively 20, is stopped opposite to the drive direction of the planet carrier 17, represented by the arrow v, as shown by way of example in FIG. 2. The sun wheel 19, 20, can freely rotate (free-wheeling) in the opposite direction. FIG. 1 here makes it clear that, in spite of the selector slides 50, 58 and 66, there is sufficient space available in the interior of the hub shaft 1 for housing the selector and cam shaft 76, even if the latter itself is designed as a hollow shaft through which a quick-action tightener 78 extends, which is schematically indicated in FIG. 1, for example.

FIGS. 9 to 13 show a preferred embodiment and seating of the selector ratchet 74, also represented in FIGS. 2 and 3. Here, FIGS. 9 and 10 respectively show a short section 1c of the hub shaft 1. The section 1c is embodied as a cylindrical hollow body and essentially consists of a cylindrical outer wall 81 enclosing a hollow chamber 80. A guide slit, or respectively an opening 83, extending perpendicularly in respect to the geometric center axis 82 of the hub shell 12 (FIG. 1) and passing through the outer wall 81, and two bearing grooves 84a, 84b, arranged laterally of the opening and extending parallel with the axis 82, which have an essentially semi-cylindrical cross section, but can also have a slit on their bottom, have been cut into this outer wall 81. The selector ratchets 74 are provided with two pin elements 75a, 75b (FIG. 9), which are formed on the sides of the ratchet and constitute the bearing pin 75 in accordance with FIGS. 2 and 3. If corresponding to FIG. 10 the selector ratchet 74 is placed into the guide slit 83, the pin elements 75a, 75b, whose bearing seating surfaces at least are cylindrically designed, exactly fit into the bearing grooves 84a and 84b, because of which the selector ratchet 74 as a whole is pivotably seated in the outer wall 81.

As shown in particular in FIG. 10, for example the sun wheel 19 in accordance with FIG. 1, which is only schematically indicated and is essentially circular in shape, is rotatably seated with little play on the section 1c. On its inner surface the sun wheel 19 has the circumferential tooth arrangement 77 and in the assembled state surrounds the selector ratchet 74 and the outer wall 81 in such a way that the selector ratchet 74 is secure against dropping out of the hub shaft 1. In this case a back 85 of the selector ratchet 74 preferably ends essentially co-planar with the outer circumferential surface of the outer wall 81, so that a pivot bearing, which is essentially free of play, results.

A particular advantage of the described seating lies in that it is possible to design the bearing pin elements 75a, 75b with a diameter which essentially is equal to the thickness of the outer wall 81 and the height of the selector ratchet 74. The bearing can be constructed considerably smaller in comparison with conventional bearings, in which pivots seated in bores are used, because of this, which is of great advantage because of the restricted space conditions in the area of the outer wall 81 located close to the center axis 82 (FIG. 1), and results in low seating surface pressures.

FIGS. 11 to 13 show sections analogous to FIGS. 2 and 3 through a sun wheel 19 and an associated selector ratchet 74. Because of the relative rotating position of the selector and cam shaft 76, the lever arm 74a extends inside the guide slit 83 as far as a cam depression 76b, because of which the lever arm 74b has entered a gap of the tooth arrangement 77 of the sun wheel 19 because of the action of a torsion spring 86, indicated in FIG. 9 and supported between the outer wall 81 and the pin element 75b. In this case, for example, respectively an end 86a, or respectively 86b, of the torsion spring 86 is supported in an associated hole of the section 1c, or respectively of the selector ratchet 74. By means of this the sun wheel 19 is fixedly connected with the hub shaft 1, or respectively the section 1c, in a direction of rotation opposite the arrows drawn in FIGS., 11 to 13, while it can perform rotations in the direction of the drawn-in arrow because of the free-wheeling effect.

In the course of a rotation of the selector and cam shaft 76 in the direction of the arrow, the lever arm 74a runs up more and more on a cam 76a, because of which the lever arm 74b is finally pivoted out of the tooth arrangement 77 against the force of the spring 86 (FIG. 13), so that now the sun wheel 19 can freely rotate in both possible directions. By means of this it is possible, as represented in FIGS. 11 to 13, to selectively bring the sun wheel 19 into contact with the tooth arrangement 77 or to disengage it by turning the selector and cam shaft 76 in one or the other direction.

As FIGS. 11 to 13 further show, the dimensions of the tooth arrangement 77 and the lever arms 74a, 74b can be matched to each other in such a way that the pin elements 75a, 75b of the selector ratchet 74 securely remain in the bearing grooves 84a, 84b, which are open at the top, even when they run up on a cam 76a (FIG. 11), because in this case the tooth tips of the tooth arrangement 77, for example, rest on both sides of the pivot axis from above against the lever arms 74a, 74b in such a way (FIG. 13), that a multipoint bearing as a whole results. By means of this an unwanted entry of the selector ratchet 74 into the engaged position is securely prevented.

Corresponding selector ratchet mechanisms are preferably associated with the remaining sun wheels 20, 22 and 23 in accordance with FIGS. 1 to 5, to which end the hub shaft 1 has a hollow-bodied section corresponding to the section 1c at least in the area of each sun wheel. Here, the section 1c suitably extends in the axial direction over the entire area occupied by the sun wheels, so that it is possible to embody a corresponding number of selector ratchets 74 at corresponding axial distances in a common circumferential wall, and a selector and cam shaft 76 extending over the entire area can be provided with a corresponding number of cams 76a and cam depressions 76b, which are arranged in tracks having corresponding axial distances from each other. In the process the guide slits 83 and the bearing grooves 84a, 84b are suitably offset from each other in the circumferential direction of the hub shaft 1 by, for example, 180° from sun wheel to sun wheel, so that the sun wheels can be arranged at short axial distances without the selector ratchets 74 interfering with each other.

In accordance with a further preferred embodiment of the invention, the hub shaft 1 has further sections, designed as hollow bodies, outside of the areas occupied by the sun wheels, which are delimited by an outer wall corresponding to the outer wall 81, and have guide slits, or respectively openings extending parallel with the axis of rotation 82 (FIG. 1), in which the selector slides 50, 58, 66, etc. are axially displaceably seated. Because of this an actuating element, here designed as a selector shaft, which extends through these hollow bodies, can be provided with means designed to displace these selector slides, by means of which the control of the selector slides 50, 58 and 66 is also possible from the interior of the hub shaft 1 through openings formed in the outer, or respectively circumferential wall 81.

Although the described control of the selector ratchets 74 and the selector slides 50, 58, 66 could basically take place by means of several actuating members, or respectively elements arranged in the hub shaft 1 and having, for example, a cam track 76a. 76b each, and independently of each other, the actuating member and the actuating element of an embodiment considered to be the best are combined in a single selector and cam shaft 76, which is suitable for setting all selectable gear ratios, as will be explained below in FIGS. 14 to 17. Here, FIG. 14 represents the exterior view of the continuously hollow hub shaft 1, FIG. 15 the selector and cam shaft 76 common for all shifting operations, and FIG. 16 sections along the lines A—A to F—F, which are intended for the assembled state in accordance with FIG. 1.

In accordance with FIG. 14, the hub shaft 1 has two axial guide slits 87 and 88, offset by 180°, in the area of the section line A—A, in which the selector slides 50, 58 (FIGS. 1, 6 and 8) are axially displaceably seated. In sections corresponding to the section lines B—B to E—E, respectively one guide slit 83 is provided for receiving respectively one selector ratchet 74 for the sun wheels 19, 20, or respectively 22, 23, wherein in accordance with FIG. 16 neighboring selector ratchets 74 are respectively offset by 180° in the circumferential direction and are alternatingly arranged facing in opposite directions in accordance with the selected direction of rotation of the sun wheels. Finally, the hub shaft 1 has two further diametrically opposed axial guide slits 89, 90 (FIG. 14) in the area of the section line F—F, in which the selector slide 66 and a selector slide 91 (FIGS. 1 and 16) serving the same purpose are displaceably seated.

While a center section of the selector and cam shaft 76 having the cams 76a in accordance with FIGS. 2, 3 and 11 to 13, is assigned to the selector ratchets 74, in the area of the guide slits 87, 88, or respectively 89, 90, the selector and cam shaft 76 has respectively two guide tracks 92, 93, or respectively 94, 95, which extend transversely in relation to the axis 82, are designed as grooves, for example, and are shown in a developed view in FIG. 17.

As shown in FIG. 7, the selector slides 50, 58 are provided with a selector pin 52, 59 each, which projects inward into the hollow body and extends into an associated guide track 92, or respectively 93, of which only respectively one half is visible in FIG. 15. The guide tracks 92, 93 are designed in the manner of switching cams or guide grooves and have detent surfaces, by which the selector pins 52, 59 are kept in contact with them by means of the compression spring 49 acting on the coupling ring 47. Each one of these detent surfaces has two selector elements (see also FIG. 17), which extend obliquely in respect to the axis 82 and are here embodied as selector faces 96, or respectively 97, which are moved past the selector pins 52, 59 by rotating the selector and cam shaft 76. In this case these selector faces 96, 97 are designed and arranged in such a way that, depending on the direction of rotation, the selector slides 50, 58 are displaced axially in one direction under the control of the selector face 96, and in the opposite direction under the control of the selector face 97, by means of which they bring the tooth arrangements 46, 48, which act as coupling elements, into or out of engagement in the manner described by means of FIGS. 6 to 8.

The selector and cam shaft 76 is provided in the area of the section lines B—B to E—E with the cam tracks, described above by means of FIGS. 2, 3 and 9 to 13, which have cams 76a and cam depressions 76b, which are therefore only schematically indicated in FIGS. 15 and 17 and are respectively offset in the circumferential direction according to the position of the selector ratchet 74.

The cams 76a and the cam depressions 76b and the selector faces 96, 97 are preferably arranged in accordance with a preselected program on the selector and cam shaft 76 in such a way, that by turning the latter in one and/or the other direction of rotation, all ratio conditions which can be produced by means of the clutch devices 26 to 29 and 31, 32 (FIG. 5) can be traversed in a preselected sequence. In case the gear hub is designed as a seven-speed gear hub, the arrangement in accordance with the invention is made such that all seven possible gear ratios 1 to 7 can be set in the sequence in accordance with Table 2.

Finally, the selector and cam shaft 76 is provided with both further guide tracks 94 and 95 in the area of the section line F—F, which are used for receiving selector pins 98, 99 (FIG. 1), which correspond to the selector pins 52, 59, but are attached to the selector slides 66 and 91. Since the selector slides 66, 91 are assigned to the clutch 41 (FIG. 5) which, in accordance with Table 2, is only switched from the one to the other state during the change from the seventh to the eighth gear (or respectively vice versa), the guide tracks 94, 95 are provided with selector elements which make these changes possible and which here are designed as further selector faces 100, 101, whose function corresponds to that of the selector faces 94, 95. In case the gear hub is designed as a fourteen-speed gear hub, the guide tracks 94, 95 in FIG. 17 are embodied in such a way, that they extend, for example, by approximately 660° around the selector and cam shaft 76 and they are respectively provided with the selector faces 100, 101 in the center, which approximately corresponds to the 330° position. For this reason, the selector pins 98, 99, which are associated with these guide tracks 94, 95 and are retained in contact with them by the springs 65, are first maintained for almost a full revolution in the one selector position when the selector and cam shaft 96 is rotated in the one direction of rotation, are the switched into the respectively other selector position by the selector faces 100, 101 and are then again maintained for almost a full revolution in this selector position. When turning the selector and cam shaft 76 back, the same selector operations take place in the opposite direction. In this case the cams 76a and the cam depressions 76b and the selector faces 96, 97 are usefully arranged on the circumference of the selector and cam shaft 76 in such a way that in accordance with Table 2 the first seven gears are run sequentially during a first revolution, then the switching of the clutch 41 takes place and then, during a second revolution of the selector and cam shaft 76, a run through the gears 8 to 14 is made. In the course of a return revolution of the selector and cam shaft 76 in the opposite direction by two full revolutions the initial position (first gear) is finally attained.

The positions of the cams 76a and the cam depressions 76b are preferably matched in the direction of rotation in such a way that the various selector devices can be easily switched even when under a load in that, for example, when selecting a new gear, the sun wheel which had been active until then remains briefly engaged by intersecting, or respectively overlapping the associated cam depressions 76b and therefore no interruption of the flow of force occurs. If the new gear is a faster gear, it becomes immediately effective, since the sun wheel active up to then can continue by free-wheeling as long as it is switched on. However, if the new gear is a slower gear, the sun wheel active up to then remains active until it is switched off, since in this case the newly selected sun wheel can pass it by means of the free-wheeling device. Undesired idling positions between two speeds are prevented by this. In addition, the described arrangement has the advantage that it is possible to easily preselect all available speeds even when the actuator 7 and/or the hub shell 12 are stopped, since the selector ratchets 74 and the other selector elements each can be actuated by springs in such a way that the selector and cam shaft 76 can also be turned when the various elements are stopped. If at the end of such a turn a selector ratchet 74 and a tooth of the tooth arrangement 77 (FIGS. 11 to 13), or two teeth of the tooth arrangements 46, 48 (FIG. 8) should accidentally be directly opposite each other, the desired coupling position would be reached after a slight further rotation of the actuator 7, since the number of teeth at the circumference of the associated components can be selected to be comparatively large.

For actuating the selector and cam shaft 76, the hub shaft 1 in accordance with FIG. 1 has, for example, a recess 102 (FIG. 14) on the end opposite the actuator 7, through which a pinion 103 (see also FIG. 15) fastened on a corresponding end on the selector and cam shaft 76 is accessible from the outside. A gear wheel 104, for example, meshes with this pinion 103, which can be turned in a manner known per se in the one or the other direction by sketched-in Bowden cables 105.

The invention is not limited to the exemplary embodiments described, which can be changed in many ways. This applies in particular to the design of the selector and cam shaft 76, which could also be designed to be of several pieces. It would furthermore be possible that the program, which is stored with the aid of the cams 76a, 76b and the selector faces 96, 97, or respectively 100, 101, is selected in such a way that it becomes necessary for passing through the individual speeds to operate more than one selector lever, a selector wheel, or the like. It would furthermore be possible to assign to the two planet gears 15, 16 more than two sun wheels and, correspondingly, more than two stages to the associated planet wheels in order to provide further gear ratios, in which case the selector and cam shaft would have to be provided with corresponding additional cam tracks. Furthermore, the described control can also be employed when the sun wheels and the associated planet wheel stages are not symmetrically arranged, or the sun wheels are connected with another stationary element of the hub shaft. In addition, the described control is independent of the number of teeth selected in the individual cases, which should only be considered as examples. The described arrangement is furthermore independent of whether further components which operate additional functions, for example a brake, are located inside the hub shaft. The invention is also not limited to the described add-on set (planet gear 35). Instead, the arrangement could for example be made in such a way that in FIG. 5 the clutch 41 is arranged between the ring gear 25 and the planet carrier 37. In this case, too, the planet gear 35 would act as a reduction gear when the clutch 41 is disengaged and as a direct gear (1:1) when the clutch 41 is engaged. If would furthermore be possible to use the planet gear 35 as a superimposed set and to arrange it between the actuator 7 and the first planet gear 15. Aside from this, the multispeed gear in accordance with the invention is not limited to use within the hub of a wheel. The gear could for example also be used in particular as an intermediate shaft gear and could be arranged for this purpose for example at a location between the bottom bracket bearing and the hub of one of the two wheels of a bicycle, in which case it could be connected via appropriate gear wheels, chains or the like on the drive side with the bottom bracket bearing, and on the power take-off side with a wheel. Even the employment of the gearshift mechanism within the bottom bracket bearing would be conceivable. Finally, it is understood that the various characteristics can also be employed in combinations other than the ones described and represented in the drawings.

What is claimed is:

1. A multispeed gearshift mechanism for bicycles, comprising: a shaft (1), which can be mounted, fixed against relative rotation, on a bicycle frame, an actuator (7), rotatably seated on the shaft (1), a shell (12), rotatably seated on the shaft (1), a planet wheel gearshift mechanism (15, 16, 35) arranged in the shell (12) and connecting the actuator (7) and the shell (12) with at least one sun wheel (19, 20, 22, 23) rotatably seated on the shaft (1), a ring gear (24, 25, 39), a planet carrier (17, 37) and a planet wheel (18, 21, 38) rotatably seated on the latter, and a clutch device (26, 27, 28, 29) for providing at least two gear ratios between the actuator (7) and the shell (12), wherein the clutch device (26, 27, 28, 29) has a tooth arrangement (77), a selector ratchet (74) and a rotatably seated actuating member (76) intended for controlling the latter, which can be operated from the outside, in such a way that for selecting the gear ratios the selector ratchet (74) can be selectively put into engagement with the tooth arrangement (77) or disengaged therefrom, that the tooth arrangement (77) is provided on the sun wheel (19, 20, 22, 23), the shaft (1) has a section (1c), which is designed as a hollow body and receives the actuating member (76), and the selector ratchet (74) is seated in an opening (83) of an outer wall (81), delimiting the hollow body, of this section.

2. The multispeed gearshift mechanism in accordance with claim 1, characterized in that the selector ratchet (74) is prestressed in the direction of the engagement with the tooth arrangement (77) by means of a spring (86).

3. The multispeed gearshift mechanism in accordance with claim 2, characterized in that the actuating member (76) has a cam (76a), which is intended to remove the selector ratchet (74) from its engagement with the tooth arrangement (77).

4. The multispeed gearshift mechanism in accordance with claim 1, characterized in that the planet wheel gearshift mechanism (15, 16, 35) has a plurality of sun wheels (19, 20, 22, 23), which are axially distanced from each other, can be selectively connected with the shaft (1) and have a tooth arrangement (77), a corresponding plurality of selector ratchets (74) is seated in the outer wall (81) of the section (1c) designed as a hollow body, and the actuating member (76) has a corresponding number of cams (76a), or respectively cam depressions (76b), wherein the selector ratchets (74) and the cams (76a), or respectively cam depressions (76b), are arranged with axial spacings corresponding to the distances between the sun wheels (19, 20, 22, 23).

5. The multispeed gearshift mechanism in accordance with claim 1, characterized in that, for providing at least one further gear ratio, it has at least one clutch (31, 41), by means of which two components (19, 7) provided with coupling elements (46, 48) of the planet wheel gearshift mechanism (15, 16, 35) can be brought into engagement with each other, or respectively disengaged from each other, wherein at least one of the coupling elements (48) is axially displaceably seated, the shaft (1) contains at least one further section designed as a hollow body and having an outer wall with an opening, in which a selector slide (50, 58) intended for controlling the displaceable coupling element (48) is displaceably seated, and means for displacing the selector slide (50, 58) are arranged in the further hollow body.

6. The multispeed gearshift mechanism in accordance with claim 5, characterized in that it has a plurality of such clutches (31, 41).

7. The multispeed gearshift mechanism in accordance with claim 5, characterized in that the selector slide (50, 58) has a first selector element (52, 59) facing the further hollow body, and the means consists of a second selector element (96, 97), which acts together with the first and is embodied at the circumference of an actuating element (76), which is rotatably seated in the further hollow body and can be operated from outside of the shell (12).

8. The multispeed gearshift mechanism in accordance with claim 4, characterized in that the cams (76a), or respectively the cam depressions (76b) are arranged in accordance with a preselected program on the circumference of the actuating member (76) in such a way, that by rotating the actuating member (76), all gear ratios, which can be selected with the aid of the selector ratchets (74) can be set in a preselectable sequence.

9. The multispeed gearshift mechanism in accordance with claim 7, characterized in that the second selector elements (96, 97) are arranged in accordance with a preselected program on the circumference of the actuating element (76) in such a way, that by rotating the actuating element (76), all gear ratios, which can be selected with the aid of the selector ratchets (74) can be set in a preselectable sequence.

10. The multispeed gearshift mechanism in accordance with claim 7, characterized in that the first selector element is a selector pin (52, 59) projecting into the hollow body, and the second selector element is a selector face (96, 97) acting on the selector pin (52, 59).

11. The multispeed gearshift mechanism in accordance with claim 1, characterized in that the shaft (1) is embodied as a continuous hollow shaft and the actuating member and the actuating element form a selector and cam shaft (76) rotatably seated in the shaft (1).

12. The multispeed gearshift mechanism in accordance with claim 1, characterized in that it is designed as a seven-speed gear and that seven gear ratios can be selected by one rotation of the actuating member (76).

13. The multispeed gearshift mechanism in accordance with claim 1, characterized in that it is designed as a fourteen-speed gear and that fourteen gear ratios can be selected by two revolutions of the common selector and cam shaft (76).

14. The multispeed gearshift mechanism in accordance with claim 1, characterized in that in the area of each selector ratchet (74), the shaft (1) has at least one guide slit (83) extending in the circumferential direction and intended for receiving the selector ratchet (74), and two bearing grooves (84a, 84b) arranged transversely thereto, and that the selector ratchet (74) is arranged in the guide slit (83) and is pivotably seated in the bearing grooves (84a, 84b) with two bearing pin elements (74a, 74b), which are formed on it and extend transversely to it.

15. The multispeed gearshift mechanism in accordance with claim 14, characterized in that the sun wheel (19, 20, 22, 23) is an annular component, which is rotatably seated on the shaft (1) and is provided with the tooth arrangement (77) on its inner surface, surrounds the shafts (1) in the area of the selector ratchet (74) and secures it against falling out of the shaft (1).

16. The multispeed gearshift mechanism in accordance with claim 5, characterized in that the coupling elements contains a coupling ring (47), which is displaceable on the shaft (1), is provided with a sawtooth arrangement (48) at one front face and is prestressed by a spring (49), is connected, fixed against relative rotation, with the components (7, 24) and, by actuating the selector slide (50, 58), can be connected with the other of the components (19), which has a corresponding sawtooth arrangement (46) on an associated front face.

17. The multispeed gearshift mechanism in accordance with claim 11, characterized in that the selector and cam shaft (76) consists of several elements, which can be controlled independently of each other.

18. The multispeed gearshift mechanism in accordance with claim 11, characterized in that the selector and cam shaft (76) consists of a component constructed in one piece.

19. The multispeed gearshift mechanism in accordance with claim 1, characterized in that it is embodied as a multispeed gear hub, wherein the shaft (1) is a hub shaft and the shell (12) and hub shell.

* * * * *